US007054874B2

(12) United States Patent
Gluhovsky et al.

(10) Patent No.: US 7,054,874 B2
(45) Date of Patent: May 30, 2006

(54) MODELING OVERLAPPING OF MEMORY REFERENCES IN A QUEUEING SYSTEM MODEL

(75) Inventors: Ilya Gluhovsky, Mountain View, CA (US); Brian W. O'Krafka, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 554 days.

(21) Appl. No.: 10/382,823

(22) Filed: Mar. 5, 2003

(65) Prior Publication Data
US 2004/0177079 A1    Sep. 9, 2004

(51) Int. Cl.
*G06F 17/00* (2006.01)
(52) U.S. Cl. .................................. 707/100; 711/118
(58) Field of Classification Search ................ 707/100; 709/316; 711/141, 207; 717/145
See application file for complete search history.

(56) References Cited

U.S. PATENT DOCUMENTS 5,478,961 A  * 12/1995 Hanna et al. ............... 717/145
5,699,551 A  * 12/1997 Taylor et al. ............... 711/207
5,903,911 A  *  5/1999 Gaskins ..................... 711/141
2002/0184403 A1* 12/2002 Dahlin et al. ............... 709/316

OTHER PUBLICATIONS

Prieto et al., "DataLocality Exploitation in the Decoposition of Regular Domain Problems", Nov. 2000, IEEE Transaction on parallel and distributed systems, vol. 11, No. 11, pp. 1141-1150.*
Publication entitled "Analytical Analysis of Finite Cache Penalty and Cycles Per Instruction of a Multiprocessor Memory Hierarchy Using Miss Rates and Queuing Theory," by R.E. Matick et al., IBM J. Res. & Dev., vol. 45, No. 6, Nov. 2001, pp. 819-842.

* cited by examiner

*Primary Examiner*—Mohammad Ali
*Assistant Examiner*—Sathyanarayan Pannala
(74) *Attorney, Agent, or Firm*—Park, Vaughan & Fleming LLP

(57) ABSTRACT

One embodiment of the present invention provides a system that facilitates modeling the effects of overlapping of memory references in a queueing system model. The system receives a memory reference during execution of a queueing system model. Upon receiving the memory reference, the system determines if the memory reference generates a cache miss. If so, the system models the cache miss in a manner that accounts for possible overlapping of the cache miss with other memory references and other processor operations.

33 Claims, 4 Drawing Sheets

MODELING OVERLAPPING OF MEMORY REFERENCES IN A QUEUEING SYSTEM MODEL

BACKGROUND

1. Field of the Invention

The present invention relates to techniques for modeling the performance of computer systems. More specially, the present invention relates to a method and an apparatus that models the effects of overlapping of memory references in a queueing system model.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, which can cause performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Hence, memory system design is becoming an increasingly important factor in determining overall computer system performance. In order to optimize memory system design, it is desirable to be able to simulate the performance of different memory system designs without actually having the build the different memory systems.

Simulations based on closed queueing networks have proven to be particularly useful in accurately determining memory system performance. In a closed queueing network, a memory request is typically generated by a processor and travels through the memory hierarchy in a manner which is determined probabilistically based on workload parameters.

However, existing queueing models for memory systems do not account for the capabilities of newer processor designs that allow memory references to be overlapped with other memory requests and processing operations, thereby hiding (or partially hiding) the latency of some of the memory requests.

Hence, what is needed is a method and an apparatus for modeling a memory system in a manner that accounts for overlapping of memory requests with other memory requests and processing operations.

SUMMARY

One embodiment of the present invention provides a system that facilitates modeling the effects of overlapping of memory references in a queueing system model. The system receives a memory reference during execution of a queueing system model. Upon receiving the memory reference, the system determines if the memory reference generates a cache miss. If so, the system models the cache miss in a manner that accounts for possible overlapping of the cache miss with other memory references and other processor operations.

In a variation on this embodiment, modeling the cache miss involves forwarding the memory reference to portions of the queueing system model associated with lower levels of a memory hierarchy. It also involves probabilistically determining whether or not the cache miss can be overlapped with other memory references. (Note that cache misses are modeled as either completely overlapping or non-overlapping, and partial overlaps are accounted for by adjusting the probabilities of complete overlap and non-overlap.) If the cache miss can be overlapped, the system resumes processing of subsequent memory references without waiting for the forwarded memory reference to return. On the other hand, if the cache miss cannot be overlapped, the system waits for the forwarded memory reference to return before processing subsequent memory references.

In a variation on this embodiment, the system probabilistically determines whether or not the cache miss can be overlapped by using a blocking factor, wherein one minus the blocking factor specifies the probability that the memory reference can be overlapped.

In a further variation, there exists a different blocking factor for each combination of cache type and memory reference type.

In a further variation, prior to processing the memory reference, the system estimates blocking factors for the queueing system model based upon empirically measured hit rates and latencies for a computer system.

In a further variation, the empirically measured hit rates and latencies can be obtained from either a computer system simulator or a real computer system.

In a further variation, estimating the blocking factors involves performing an iterative process that estimates the blocking factors based on latencies and hit rates, and runs the queueing system model using the estimated blocking factors to determine new latencies to be used in estimating successive blocking factors.

In a further variation, estimating the blocking factors involves using a backfitting technique.

In a further variation, the backfitting technique is modified to estimate a product term which is part of an additive component, wherein the additive component is the CPI penalty associated with a specific memory hierarchy level and reference type.

In a further variation, the backfitting technique uses computed weights in a smoothing step.

In a further variation, the system incorporates the blocking factors into cache hit rates within the queueing system model.

In a variation on this embodiment, if the memory reference accesses a memory location that is in the modified state, indicating that a modified content of the memory location resides in an L2 cache, the system forwards multiple memory references to multiple queues associated with multiple L2 caches, and then waits for each of the multiple memory references to return.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Exemplary Computer System

Figure 1:
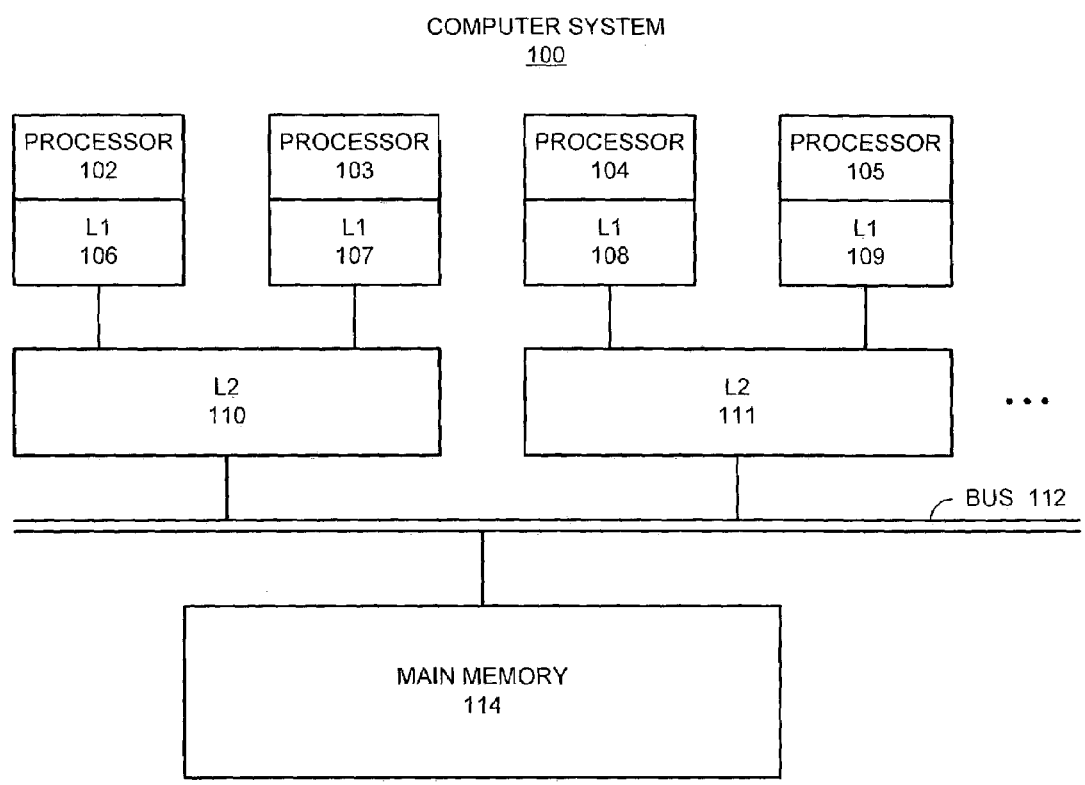
FIG. 1 illustrates a computer system.

FIG. 1 illustrates an example of a computer system to be modeled 100 in accordance with an embodiment of the present invention. Computer system 100 includes a number of processors 102–105, which are coupled to respective level 1 (L1) caches 106–109. (Note that L1 caches 106–109 can include separate instruction and data caches.) L1 caches 106–109 are coupled to level 2 (L2) caches 110–111. More specifically, L1 caches 106–107 are coupled to L2 cache 110, and L1 caches 108–109 are coupled to L3 cache 111. L2 caches 110–112 are themselves coupled to main memory 114 through bus 112.

Note that the present invention can generally be used to simulate the performance of any type of computer system and is not meant to be limited to the exemplary computer system illustrated in FIG. 1.

Queueing System Model

Figure 2:
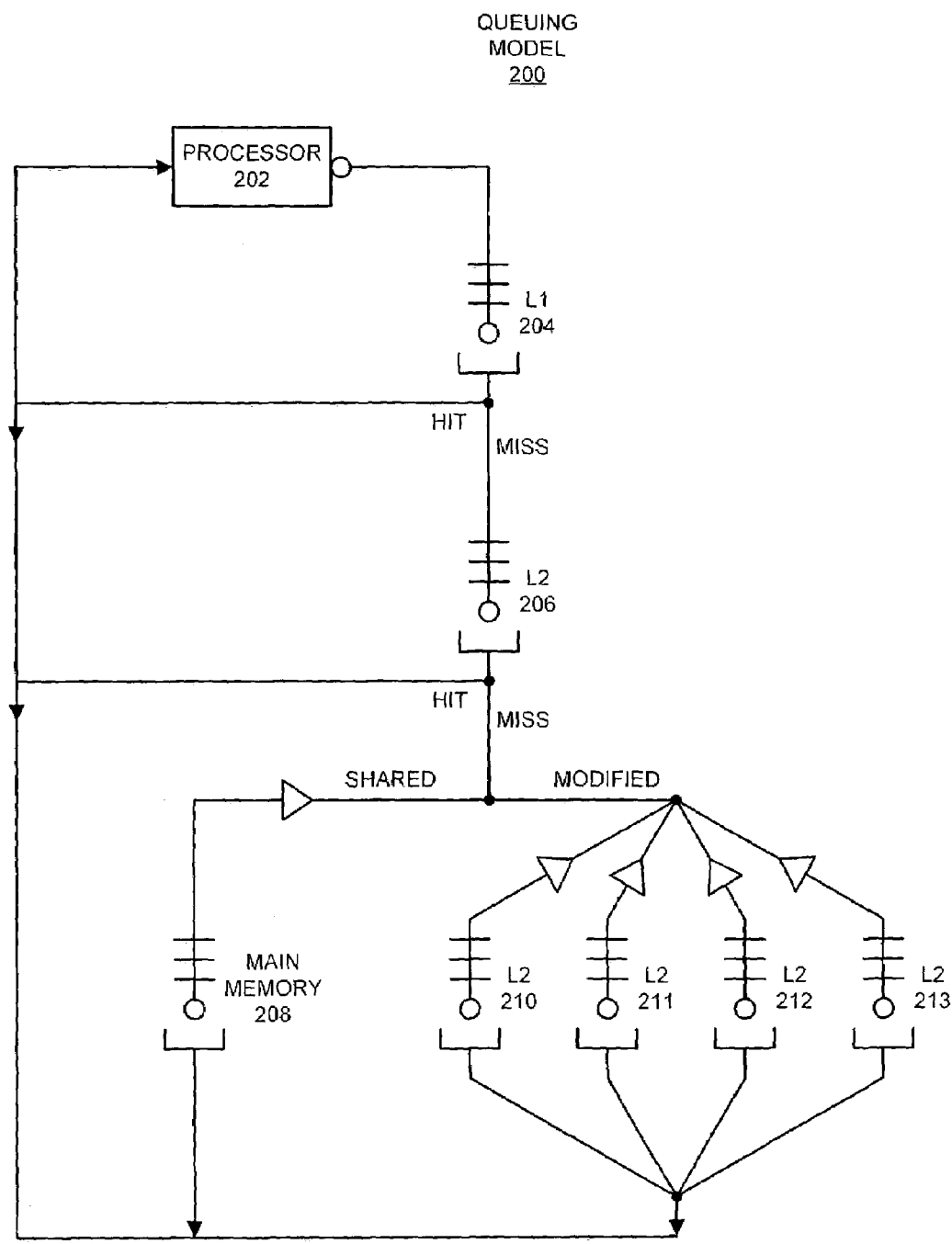
FIG. 2 illustrates a queueing model for a computer system in accordance with an embodiment of the present invention.

FIG. 2 illustrates an exemplary queueing model 200 for a computer system in accordance with an embodiment of the present invention. Model 200 may be used to simulate the performance of memory references that originate from processor 102 in computer system 100 (illustrated in FIG. 1). For example, processor 102 can be modeled by processor model 202, L1 cache 106 can be modeled by L1 model 204, L2 cache 110 an be modeled by L2 model 206, and main memory 114 can be modeled by main memory model 208. Note that each of these model elements accounts for a queueing delay as well as a service time.

Memory references are routed between the model elements as follows. If a memory reference generates a cache hit in L1 model 204, the memory reference returns to processor model 202. Otherwise, the memory reference is forwarded to L2 model 206. If the memory reference generates a cache hit in L2 model 206, the memory reference returns to processor model 202.

Otherwise, if the memory reference generates a cache miss in L2 model 206, a two things can happen. If the memory reference accesses a shared data item that has a valid copy in main memory, the memory reference is forwarded to main memory model 208. On the other hand, if the memory reference accesses a modified data item that does not have a valid copy in main memory, but instead has a modified copy in an L2 cache, derivative memory references are sent to models for each of the L2 caches 210–213, and the system uses a mutex mechanism to ensure that each of the derivative memory references completes before the original memory reference is returned to processor model 202.

Note that the present invention can be applied a many different types of queueing models and is not meant to be limited to the exemplary queueing model illustrated in FIG. 2.

Process of Estimating Blocking Factors

Figure 3:
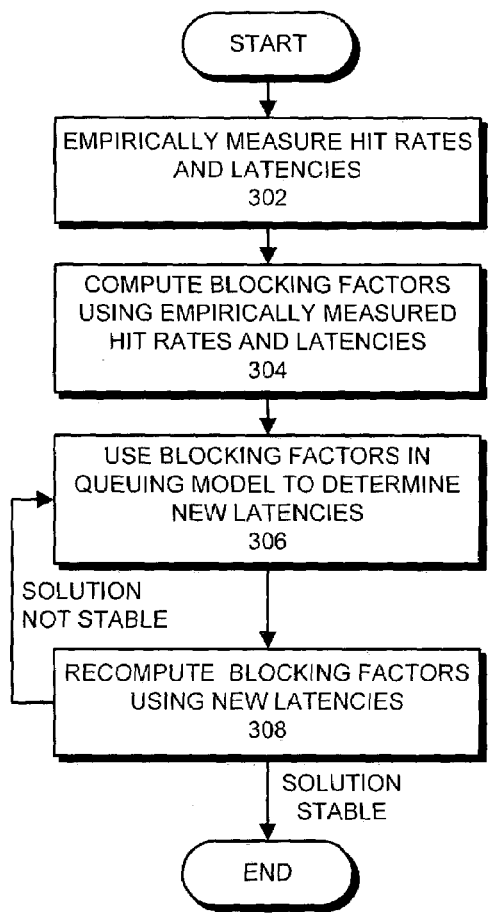
FIG. 3 presents a flow chart illustrating the process of estimating blocking factors in accordance with an embodiment of the present invention.

FIG. 3 presents a flow chart illustrating the process of estimating blocking factors in accordance with an embodiment of the present invention. Blocking factors are used to determine whether or not the latency of a given memory reference can be overlapped with other memory references or processing operations. The system first empirically determines hit rates and latencies for various cache memories within a computer system (step 302). This can involve gathering empirical data from a real computer system, or alternatively, from a computer system simulator. Next, the system computes initial blocking factors using the empirically determined hit rates and latencies (step 304).

The system then performs an iterative process in which blocking factors are used by the queueing model to determine new latencies (step 306), and the new latencies are used to re-compute blocking factors (step 308). This iterative process terminates when a solution stabilizes. Note that this process is described in more detail in following sections of this disclosure.

Process of Modeling a Memory Reference

Figure 4:
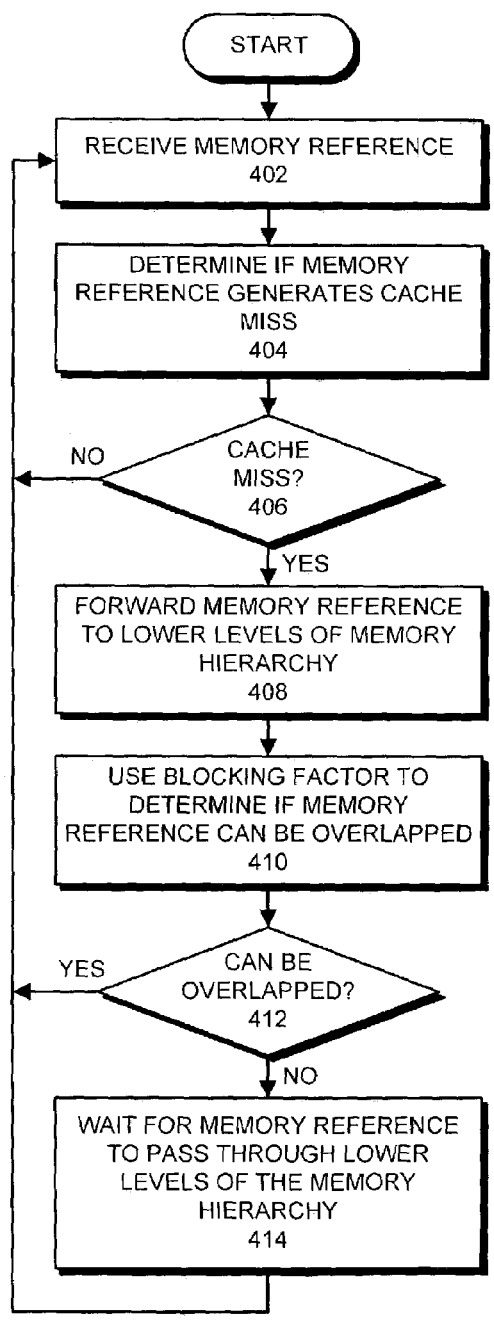
FIG. 4 presents a flow chart illustrating the process of modeling a memory reference in accordance with an embodiment of the present invention.

FIG. 4 presents a flow chart illustrating the process of modeling a memory reference in accordance with an embodiment of the present invention. The system starts by receiving a memory reference during execution of a queueing model (step 402). Next, the memory references passes into a cache model. The system then determines if the memory reference generates a cache miss (step 404). If not, the memory reference returns to the processor, and the system returns to step 402 to process the next memory reference.

Otherwise, if the memory reference generates a cache miss, the system forwards the memory reference to lower levels of the memory hierarchy (step 408). The system also uses a previously computed blocking factor to determine if the memory reference can be overlapped (step 410). If so, the system returns to step 402 to process another memory reference without waiting for the memory reference to return.

Otherwise, if the memory reference cannot be overlapped, the system waits for the memory reference to pass through lower levels of the memory hierarchy before processing a subsequent memory reference (step 414).

Note that the in a real computing system, the latency of a cache miss may only be partially hidden through overlapping with other memory references or other processor operations. However, in one embodiment of the present invention, the queueing model is simplified so that the latency of a cache miss is either completely hidden or cannot be hidden at all.

Moreover, note that memory reference are always sent to lower levels of the memory hierarchy on a cache miss, even if the latency of the memory reference can be hidden. This is done so that the memory reference will occupy resources of the memory system in a realistic manner, which may possibly delay other memory references that the processor has to wait for.

We now describe the modeling process in more detail. In doing so, we first discuss characteristics of the queueing network model.

Closed Queuing Network Model for a Memory System

Closed queueing networks are an important class of models for system description. They abstract a routing mechanism thereby a memory request generated by a processor travels through some or all levels of cache and main memory and can also be serviced by a different processor's cache. As soon as the processor receives a served request back, it introduces a short (infinite cache CPI) delay and generates a new request, thus a closed network. Modern superscalar processors can issue several requests per cycle, and this is abstracted by using smaller delays (respectively, smaller infinite cache CPI).

A modern computer system memory can service multiple memory requests concurrently. Given enough processor and system resources (such as the instruction scheduling window or the load queue size) coupled with some inherent parallelism of the workload, some of actual memory references can be overlapped, thus reducing the effect of memory system latency on performance. This overlap can take a variety of forms. Some requests may be overlapped almost entirely, some may overlap just barely, and there may be any number of the requests, all overlapped to some extent. For the purposes of modeling a system with a queueing model, this needs to be abstracted appropriately.

We propose the following abstraction. Whenever it is decided that a memory reference experiences a miss of a certain kind, we also decide whether the miss penalty is added to the instruction execution time or whether the miss only increases resource utilization without impacting performance directly. Thus, this abstraction splits misses into two categories, those that add to the execution time directly and those that do not. As mentioned above, most misses are only partially overlapped, so this is an approximation. In order to implement this abstraction, we have to provide a mechanism that produces a good approximation to a real execution pattern.

A queueing model assumes that an infinite cache CPI is known for some level $l_0$ of the cache hierarchy. In our application described below, it is the level 2 (L2) cache ($l_0=2$). Then only the part of the memory system from level $l_0$ down (away from the processor) is modeled. Therefore, for the purposes of this discussion, we will refer as "memory system" to just its modeled part.

We introduce the following definitions and notation. Let $mr_{l,ref}$ denote the miss rate per instruction for cache level l and reference type ref (e.g., L2 cache clean load miss). Let $hr_{l,ref}$ be the corresponding hit rate. It is the percent of all instructions that are memory references ref and that (reach and) hit in cache level l. The hit and miss rates are related through $hr_{l,ref}=mr_{l-1,ref}-mr_{l,ref}$. Let $lat_l$ be the time a level l hit spends in (the modeled part of) the memory system. This would be commonly referred to as the load-to-use latency, except it also includes a queueing delay. On the other hand, let $pen_{l,ref}$ be the average execution time penalty of an average level l hit of type ref. It is sometimes called "miss penalty," viewing a level l-1 miss as a level l hit. $pen_{l,ref}$ is dependent on the utilized memory parallelism in the workload.

A blocking factor $BF_{l,ref}$ associated with a particular cache level l and reference type ref is the ratio of $pen_{l,ref}$ and $lat_l$. It is the percentage of the latency that is not hidden by memory overlap and therefore directly impacts execution time. This notion is central to the proposed abstraction, therefore, we pause to illustrate its calculation in a simplistic situation.

Example. Assume that we do not distinguish among different reference types (e.g., between loads and stores), there is only one memory below level $l_0$ and whose BF is of interest. Suppose its latency lat=40 ns. By simulation, we find out that to service 1,000 memory hits, the memory was occupied 30,000 ns. Then BF=30/40=0.75.

It is implicitly assumed that all references are on the critical path of the processor. In reality, we don't really care whether a reference that doesn't add to the execution time is overlapped or not. We return to this discussion later in this section.

Let CPIM denote the average instruction time in processor cycles spent in the memory system. Then $$CPIM = \sum_l \sum_{ref} hr_{l,ref} * lat_l \qquad (1)$$

Let CPI be as before the average instruction execution time in processor cycles and let $CPI_{inf}$ be the CPI for the infinite level $l_0$ cache. In the absence of memory overlap, $CPI=CPI_{inf}+CPIM$. In reality, only part of the CPIM contributes to CPI. In particular, $$CPI = CPI_{inf} + \sum_l \sum_{ref} hr_{l,ref} * pen_{l,ref} \qquad (2)$$

Since $pen_{l,ref}=BF_{l,ref}*lat_l$, $$CPI = CPI_{inf} + \sum_l \sum_{ref} hr_{l,ref} * BF_{l,ref} * lat_l \qquad (3)$$

A queueing model typically gives a similar CPI breakdown:

$$CPI = CPI_{inf} + \sum_l \sum_{ref} hr_{l,ref} * lat'_{l,ref} \qquad (4)$$

where $lat'_{l,ref}$ is the sum of hardware latency and a queueing delay. Two alternatives to readily incorporate the blocking factors into equation 4 are to modify either the hit rates or the latencies. Since lat' incorporates the queueing delay and the BF, being a function of the latency as we will see, also depends on the queueing delay, but we can only modify the hardware part lat' in a straightforward manner, we propose to target the hit rates. A queueing model incorporating the BFs would fit as follows. We assume that we already have a mechanism to compute the BFs. It will be described in the following section.

Queueing Model Fitting
(i) Compute the BFs using hardware latencies.
(ii) Cycle:
  Fit the queueing model using $hr_{l,ref}*BF_{l,ref}$ as the new hit rates.
  Extract the latencies (including queueing delays).
  Recompute the BFs using the new latencies.
(iii) Continue (ii) until the solution stabilizes.

Given the set of BFs the algorithm above re-estimates the queueing delays that in turn are used to re-estimate the BFs. A common situation is that introduction of BFs hides memory latency, thus, allowing a processor to generate memory requests faster, increasing utilization of system resources and causing greater queueing delays. The latter result in increased observed latencies, thus, requiring different BFs. Latencies and BFs are then iterated to convergence by running a system model and updating the predicted BFs with newly observed latencies.

Now we need to compute the BFs. One may wonder why the BFs cannot be computed as in the example above. One simple reason is that in the example we, made several simplifying assumptions, such as having only one type of miss. In that case, it suffices to know the total time that the memory was occupied. Suppose now that we want to distinguish instruction misses from load misses from store misses, all within the memory. Then, our equation will look like, $$CPIM = lat * (hr_{inst} * BF_{inst} + hr_{load} * BF_{load} + hr_{store} * BF_{store})$$

Thus, we have an infinite number of possibilities for the BFs to make the equation an equality. Also, since realistic memory hierarchies have several levels, different level hits would be potentially serviced in the same level concurrently. It would seem that a solution is for a simulation to extract more information. For example, it could monitor the number of different types of misses being serviced every cycle at all levels of the memory hierarchy. If we can efficiently and accurately collect these data, we would then compute the average degree of overlap for each hit type.

A more fundamental reason why direct computation is not feasible is as follows. Some memory references may not be on the critical path of the processor. Even if they are not overlapped and take longer to return the data to the processor, the impact on execution time is small. For example, suppose that a load that is not on the critical path is overlapped with another load. Nominally, we would say that the BF should be 0.5. Suppose on the other hand, that the two loads are services sequentially. Then the ensuing BF is 1.0. However, the execution time in both cases is roughly the same. To put it another way, the miss penalty of this load is almost zero.

Another situation where nominal BFs do not work is when a processor stalls for reasons other than waiting for a miss to be satisfied. For example, suppose that while the processor is stalled, a load is half way serviced. Since this stall is already part of the $CPI_{inf}$, the contribution of that load to the CPI is only half of its nominal latency. However, its nominal BF is 1.0 if no overlap takes place.

Therefore, as far as the use of BFs in a system model is concerned, the nominal BFs, such as those obtained by only looking at the memory hierarchy, can give wrong values for explaining CPI. In the former case, for instance, since that load was not on a critical path, its contribution to CPI is almost zero, so its actual BF is zero. Hence, it should contribute a zero into computing an averaged ("steady state") BF to be used in a system model in the manner discussed.

As another illustration, in the later case, that load only contributes half of the associated latency to the execution time, so its contribution to the BF should be 0.5. The bottom line is simple. All we care about is to accurately assess the portion of memory latency that impacts execution time.

The proposed modeling method automatically takes care of these issues because it models the performance impact of each type of memory references. Another impact that we model is the shared use of resources by multithreaded CPUs. If the memory references generated by different threads are not completely overlapped due to resource contention that is not part of $CPI_{inf}$, additional execution time penalty is caused. It can be abstracted using the BF approach.

Whenever something cannot be measured directly, one tries to set up an experiment involving an unknown and then estimate the unknown to best fit the data. As a simple example, one can consider estimating the freefall acceleration by measuring weight and mass of some objects and then regressing the former on the latter. We take a similar approach here.

A simulator can be set up to measure for a given workload the average time that an instruction takes. Just as one takes different (mass) objects in the example above, we can simulate systems with a variety of latencies and cache configurations resulting in different miss rates. Additionally, BFs may depend on the cache configuration itself, not just on the ensuing miss rate. Thus, a comprehensive experiment may involve sampling over a range of cache configurations and latencies. These data are then modeled and the BFs are predicted for the whole domain of cache configurations and latencies. One can also test what cache configuration parameters actually affect the BFs enough to be included in the analysis for a particular workload. Modeling BFs is the emphasis of this paper. In the next Section we will go into details of how to make the modeled BFs suitable for use in a system model.

Predicting Blocking Factors

In this section, we first describe the modeling methodology. After that, we discuss the experimental design problem. Finally, we discuss the choice of the BF abstraction.

Modeling Blocking Factors

Assume that the data have been collected. The data set has P predictors corresponding to hit rates of different reference types and associated latencies per level of memory hierarchy. Typically, we distinguish load, instruction, and store references, so together with the latencies for a three level cache hierarch, P=12. Additionally, intervention misses may also need to be taken into account. Also, if it is suspected that a cache configuration itself plays a role in determining BFs in ways other than through associated hit rates, cache configuration parameters would be added to the list of predictors. The response variable is CPI over, say, 1,000 instruction snaps. Each snap is simulated with different memory hierarchy parameters (such as cache sizes or latencies) that are used as the predictors of the response. We assume to that we know $CPI_{inf}$. We will fit model (3) using these data.

A valid question now is why not just fit a linear or a polynomial regression model to the data. In a sense, (3) is unduly complex as far as fitting the data is concerned. However, one must remember that we are trying to estimate precisely the BFs. Thus, BFs must figure in the model. Usually, regression models are fitted either for the purposes of prediction of the response or to separate individual and interaction effects of significant predictors. Here we are disinterested in prediction. For that we use a system model, Here we use a rather specific system configuration (with varying predictors) to estimate the BFs. We will then generalize the obtained BFs to other systems. We will have to justify using generic BFs for different systems. Jumping ahead, the understanding is that BFs are mostly impacted by the processor and the predictors we are using in the model.

Since in a queueing model BFs are used to essentially modify the hit rates, we may consider combining $BF_{l,ref} * hr_{l,ref}$ into one entity. This will work fine as long as we allow $BF_{l,ref}$ to vary as a function of $hr_{l,ref}$. Denoting this product by $ehr_{l,ref}$ for the effective hit rate, we will use it in place of the raw hit rates during system model runs. (3) becomes $$CPI = CPI_{inf} + \sum_{l}\sum_{ref} ehr_{l,ref} * lat_l \quad (5)$$

$ehr_{l,ref}$ must be near zero when $hr_{l,ref}$ is near zero, so the fitting method must be able to address that. Also, BFs usually render more straightforward interpretation than ehr's. On the other hand, direct estimation of the quantity of interest may be more appropriate.

We now have to have a modeling method to fit model (3). Note the following. First, BFs are restricted to be between zero and one. When either $hr_{l,ref}$ or $lat_l$ is zero, $BF_{l,ref}$ is not determinable, or simply put, can be anything. When the product of the former is close to zero, estimation of $BF_{l,ref}$ is ill-posed. However, since BFs get multiplied by those products, this problem is not essential. In fact, we don't care as much about the accuracy of BF prediction for small values of these products. They will be important mainly for interpretation, but would affect little the resultant performance estimates.

Second, $CPI_{inf}$ is not just an intercept term in a regression problem. In order to make it correspond to its intended meaning, the rest of the right-hand side of (2) must be zero for the infinite cache system. Since adding a constant to one of the summands and subtracting it from another does not change the sum, a least squares criterion does not differentiate between them. However, the additive components do change, and since we are after recovering those, this "intercept" either has to be estimated separately or the rest of the "zero" constraint above has to hold. For the problem at hand, it is usually easy to simulate a system with an infinite cache, and by evaluating $CPI_{inf}$ directly, this problem is eliminated. We assume $CPI_{inf}$ to be known from now on.

We now propose a method for fitting model (3). The goal is to make few prior assumptions as to the shape of the BFs. Also, we would like to allow them to vary as functions of several predictors and then choose the significant predictors. Thus, we resort to the following nonparametric methods.

Let y be the response vector of measured CPI, $hr_{l,ref}$ and $lat_l$ are vectors of the hit rates and latencies where y is measured, $bf_{l,ref}$ is a vector of the current estimates of $BF_{l,ref}$ at the data locations and the $BF_{l,ref}$ is modeled as a function of set $P_{l,ref}$ of predictors, for example, $P_{l,ref} = \{r_{l,ref}, lat_l\}$.

This is an adaptation of the a backfitting technique described in, *Generalized Additive Models*, T. J. Hastie and R. J. Tibshirani, Chapman and Hall, 1990 [Hastie]. Even though the resultant BFs are defined by the algorithm over the whole domain of predictors, the algorithm only uses the BFs at the data locations. These are denoted as bfs. First they are initialized to zero. A better initialization would be to some sort of an overall average value, although we did not find the results to be sensitive to an initialization scheme. Next, we go through all of the BFs updating them one at a time within (ii). We now go through a generic update.

Consider a simpler population problem. Given random variables X, Y and Z, find function f that minimizes a least squares criterion $E(Y-f(X)Z)^2$, where E stands for expectation. We write it as $EZ^2((Y/Z)-f(X))^2$. In the corresponding data problem, having vectors x, y and z and trying to do the same, it is thus reasonable to find f by smoothing y/z against x with weights given by $z^2$. Intuitively, making the same error in f(x) when the corresponding z is large introduces larger penalty. That is, suppose a particular $y=f_x z$, but we estimated f as $f'_x = f_x + *$. Then the fit incurs error $(y-f'_x z)^2 = *^2 z^2$. This explains the use of the proposed weights.

The response transformation aims to achieve two goals. First, by subtracting from y the current estimate of the part that does not involve the BF to be modified, we are trying to isolate the part which the BF is supposed to explain. This is a generic backfitting idea. Second, we fit the BF to what it is supposed to estimate, namely, the part of the instruction time due to a particular hit divided by the appropriate hit rate and latency. A transformation such as this becomes a necessity when a BF is not modeled as a function of either a hit rate or a latency, in which case one may not fit a general function to an additive component $BF_{l,ref}*hr_{l,ref}*lat_l$ and then divide it by $hr_{l,ref}*lat_l$ to get the BF since that function would in general involve both the hit rate and the latency.

The smoothing step fits a smooth function of arguments in $P_{Level,Ref}$ to response. It is a nonparametric method for estimating a smooth function. Thus, one need not prescribe a particular functional form as in a parametric method, such as regular regression. Smoothing methods are covered, for example, in [Hastie]. In our application presented previously, we used the loess smoother.

The last two lines inside the loop enforce an obvious constraint for the bfs. It is mostly useful during the first few iterations when unfortunate initialization may send the procedure the wrong way. Once the BFs stabilize, this constraint will (hopefully) be enforced implicitly.

---

Method 1.

---

(i) Initialize: $bf_{l,ref}$ to zero vectors.
(ii) Cycle:
    for Level = 1:L
        for Ref = 1:R $$\text{response} \leftarrow \frac{\left(y - CPI_{inf} - \sum_{l,ref \neq Level,Ref} bf_{l,ref} * hr_{l,ref} * lat_l\right)}{hr_{Level,Ref} * lat_{Level}}$$

$bf_{Level,Ref} \leftarrow \text{smooth}(\text{response} \mid P_{Level,Ref}, \text{weights} = (hr_{Level,ref} * lat_{Level})^2)$
        $bf_{Level,Ref}[bf_{Level,Ref} < 0] \leftarrow 0$
        $bf_{Level,Ref}[bf_{Level,Ref} > 1] \leftarrow 1$ (iii) Continue (ii) until vectors $bf_{l,ref}$ don't change We introduced sets $P_{l,ref}$ of predictors of which $BF_{l,ref}$ is a function. The next question is how much flexibility we have in choosing the $P_{l,ref}$ and within these constraints, how to pick them. Note that we cannot choose the $P_{l,ref}$ to be all possible predictors. Observe the following expansion of (3) where we explicitly expressed the $BF_{l,ref}$ as functions of the $P_{l,ref}$.

$$CPI = CPI_{inf} + \sum_{l}\sum_{ref} BF_{l,ref}(P_{l,ref}) * r_{l-1,ref} * lat_l \qquad (6)$$

If all the $P_{l,ref}$ involved all of the predictors, the additive components would not be identifiable. One could add an arbitrary function to one and subtract it from another without disturbing the fit. More precisely, if there are two terms (abusing notation slightly) $BF_1(P_1)*hr_1*lat_1$, and $BF_2(P_2)*hr_2*lat_2$ and $BF_1(P_1)$ and $BF_2(P_2)$ are general smooth functions with $hr_1, lat_1 \in P_2$ and $hr_2, at_2 \in P_1$, one can add term $c*hr_2*lat_2$ to the $BF_1$ and subtract term $c*hr_1*lat_1$ from $BF_2$ without changing the fit, provided that constant c is small enough for the BFs to remain no more than one. If there are any common predictors in $P_1$ and $P_2$, c can be made dependent on them. Thus, we have an identifiability problem. To avoid it, we could restrict $P_i$ not to contain any pairs of hit rates and latencies together except the one corresponding to the BF. However, since several terms may correspond to the same level of cache and thus have the same associated latency, we can simply restrict $P_i$ not to contain any hit rates except the one corresponding to the $BF_i$: $hr_j \notin P_i$ if $j \neq i$. If this assumption is not reasonable, one has to provide alternative restrictions to resolve the problem. Now, model selection techniques such as cross-validation [Hastie] can be used to decide on the specific sets P to use.

We know present another method which is similar in spirit to the first one, except the response undergoes further transformation to make sure that the BFs stay between zero and one. Below, $logit(x)=log(x/(1-x))$, $posit(x)=0*I_{\{x<0\}}+x*I_{\{0 \# x \# 1\}}+1*I_{\{x>1\}}$, and $expit(x)=exp(x)/(1+exp(x))$.

(we call it expit) to multiply the existing weights. Where expit is flat, we do not worry about accuracy as much and hence attach lower weights.

Designing Experiment for BF Modeling

In the subsection above we assumed that we already had the data collected with which to do modeling. We now emphasize the fact that the quality of the resultant model largely depends on the quality of data. In order to extract maximum amount of information from an experiment under a constrained amount of resources, i.e. a limited number of timer runs, one should carefully choose the sample points.

One such consideration is that the sample should be collected uniformly. Uniformity does not mean randomness, but rather an absence of dense regions at the expense of other (sparse) regions.

The second consideration is the projection properties of the sample. We are dealing with a multidimensional space, not all of whose predictors contribute equally. Imagine the situation where one of the predictors is almost irrelevant (insignificant). In general, we could waste sampling along that predictor if we don't know about its insignificance in advance. To prevent this form happening, we a priori design the experiment in such a way that not only is the sample itself uniform, but also its projections to lower-dimensional subspaces are. In that case, adding an insignificant dimension does not diminish the usefulness of the sample, except by adding some noise.

Third, as the data are being collected we may want to increase the density of sampling in those regions where more subtle behavior is observed. For instance, in Example 1, we see greater change in the behavior of $BF_1$ over smaller miss rate.

The Choice for the Blocking Factor Abstraction

It can be seen that in a queueing system model the breakdown of the CPI by the time an average instruction spends at a given cache hierarchy level servicing a particular

---

Method 2.

(i) inidalize. $bf_{l,ref}$ to zero vectors.
(ii) Cycle:
    for Level = 1:L
        for Ref = 1:R $$response \leftarrow \log it\left(posit\left(\frac{y - CPI_{inf} - \sum_{l,ref \neq Level,ref} bf_{l,ref} * hr_{l,ref} * lat_l}{hr_{Level,Ref} * lat_{Level}}\right)\right)$$

$$weights \leftarrow (hr_{Level,Ref} * lat_{Level})^2 * (expit'(response))^2$$

$$bf_{Level,Ref} \leftarrow expit(smooth(response \mid P_{Level,Ref}, weights = (weights))$$

(iii) Continue (ii) until vectors $bf_{l,ref}$ do not change.

---

The idea is to transform the response between zero and one to the real line with an invertible mapping, fit it, and then transform the fit back using the inverse map. This implicitly tells the model that the BFs must remain between zero and one. The logit transformation is a popular choice for this map. Additionally, we may need to change the weights. Observe that making an error of * in the tails (far from the origin) on the transformed scale is not as costly. Thus, we can use the square of the derivative of the inverse of logit type of a miss can be made in (at least) two equivalent ways. One way was presented in the Introduction in (2). Below is another possibility:

$$CPI = CPI_{inf} + \sum_{l}\sum_{ref} mr_{l-1,ref} * penalty_{l,ref} \qquad (7)$$

Here mr are miss rates as in the Introduction and penalty$_{l,ref}$ stands now for the part of the latency$_l$ of the level l cache only (as opposed to the load-to-use latency lat$_l$) that impacts execution time. In other words, the penalty is the impact of time spent in one level of cache alone. The two formulae are equivalent, but the associated BFs are not. It would seem possible to define the BFs for (7) in the following fashion:

$$CPI = CPI_{inf} + \sum_{l}\sum_{ref} BF'_{l,ref} * mr_{l-1,ref} * latency_{level} \qquad (8)$$

By the same reasoning as before, we would use $mr_{l-1,ref}*BF'_{l,ref}$ as the effective miss rate. However, here is what happens. Essentially, this abstraction allows a miss to be overlapped in, say, L2 cache, but not to be overlapped in L3 cache. More precisely, with probability $mr_{l-1, ref}*(1-BF'_{l,ref})$ a reference is a miss that is overlapped. Suppose it misses in level l cache too. Now it must either add to the execution time (with probability $mr_{l,ref}*BF'_{l+1,ref}$) or just increase resource utilization (with probability $mr_{l,ref}*(1-BF'_{l+1,ref})$). However, the queueing model lost this reference at level level cache because it effectively "hit" there. Thus, this request needs to be recreated at the next cache level at some future time. This would add quite a bit of complexity and heuristics to a queueing model. (1) introduces no such problem.

EXAMPLE

Here we will obtain a model for two BFs corresponding to misses to the L2 cache and misses to the main memory. We will use indices 1 and 2 respectively. Here we do not distinguish among types of misses (e.g. loads).

This modeling was done using data obtained by heuristically changing some miss rates and latencies without using any formal experimental design methodology discussed in the preceding section. As a result, for example, out of the 27 data points, 22 have the same L2 latency.

The miss rates were varied by changing the cache size. Therefore, we do not include the cache size as one of the predictors. This leaves us with two pairs of miss rates and latencies and we make the two BF be functions of the corresponding pairs. Thus, the model looks like $$AIT=AIT_{inf}+BF(r_1,lat_1)*r_1*lat_1+BF(r_2,lat_2)*r_2*lat_2$$

In the notation of the preceding section, $P_1=\{r_1, lat_1\}$ and $P_2=\{r_2, lat_2\}$.

Figure 5B:
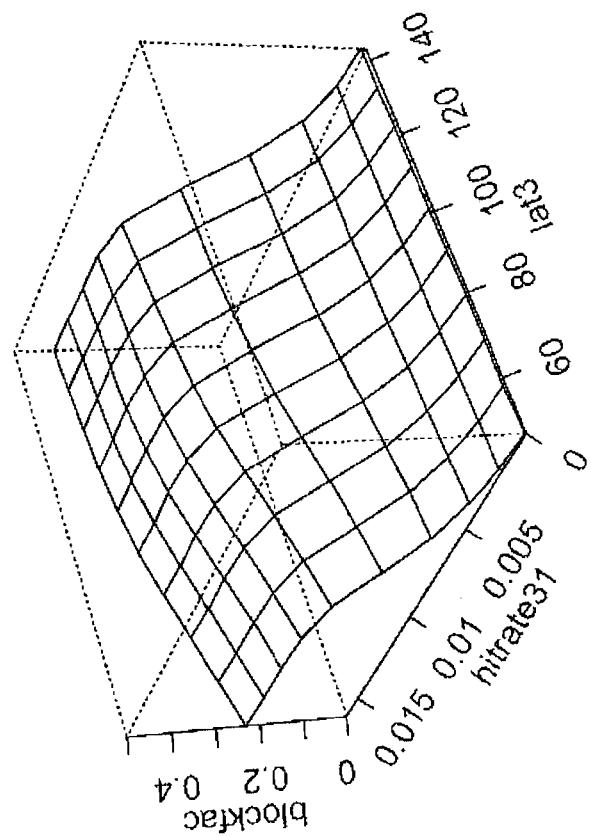
FIG. 5B presents an exemplary graph showing another blocking factor as a function of hit rate and latency in accordance with an embodiment of the present invention.
Figure 5A:
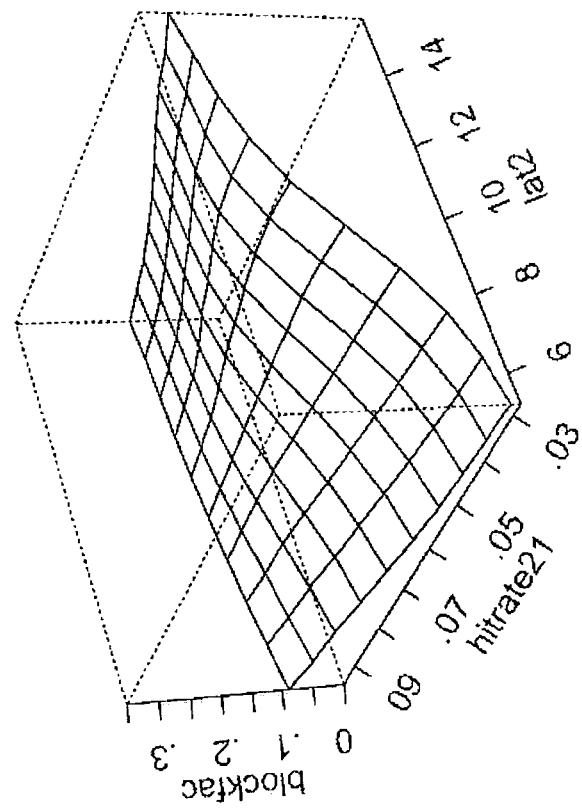
FIG. 5A presents an exemplary graph showing a blocking factor as a function of hit rate and latency in accordance with an embodiment of the present invention.

For example, method 2 produces the BFs shown in FIGS. 5A and 5B respectively. Note that the BFs have somewhat better behavior of the latter BF$_2$ near zero miss rate. As we said before, this is mostly important for interpretation purposes since when either the miss rate or the latency is near zero, the effect of the BF is small.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for modeling the effects of overlapping of memory references in a queuing system model, comprising:
   processing a memory reference during execution of a queuing system model that simulates performance of a memory system;
   determining if the memory reference generates a cache miss;
   if the memory reference generates a cache miss, modeling the cache miss in a manner that accounts for possible overlapping of the cache miss with other memory references and other processor operations; and
   wherein modeling the cache miss involves,
      forwarding the memory reference to portions of the gueuing system model associated with lower levels of a memory hierarchy,
      probabilistically determining whether or not the cache miss can be overlapped with other memory references, wherein cache misses are modeled as either completely overlapping or non-overlapping, and wherein partial overlaps are accounted for by adjusting the probabilities of complete overlap and non-overlap,
      if the cache miss can be overlapped, resuming processing of subsequent memory references without waiting for the forwarded memory reference to return, and
      if the cache miss cannot be overlapped, waiting for the forwarded memory reference to return before processing subsequent memory references.

2. The method of claim 1, wherein probabilistically determining whether or not the cache miss can be overlapped involves using a blocking factor, wherein one minus the blocking factor specifies the probability that the memory reference can be overlapped.

3. The method of claim 2, wherein there exists a different blocking factor for each combination of cache type and memory reference type.

4. The method of claim 3, wherein prior to processing the memory reference, the method further comprises estimating blocking factors for the queueing system model based upon empirically measured hit rates and latencies for a computer system.

5. The method of claim 4, wherein the empirically measured hit rates and latencies can be obtained from one of:
   a computer system simulator; and
   a real computer system.

6. The method of claim 4, wherein estimating the blocking factors involves iteratively:
   estimating the blocking factors based on latencies and hit rates; and
   running the queueing system model using the estimated blocking factors to determine new latencies to be used in estimating successive blocking factors.

7. The method of claim 4, wherein estimating the blocking factors involves using a backfitting technique to estimate the blocking factors.

8. The method of claim 7, wherein the backfitting technique is modified to estimate a product term which is part of an additive component, wherein the additive component is the CPI penalty associated with a specific memory hierarchy level and reference type.

9. The method of claim 7, wherein the backfitting technique uses computed weights in a smoothing step.

10. The method of claim 4, further comprising incorporating the blocking factors into cache hit rates within the queueing system model.

11. The method of claim 1, wherein if the memory reference accesses a memory location that is in the modified state, indicating that a modified content of the memory location resides in an L2 cache, forwarding the memory reference involves:

forwarding multiple memory references to multiple queues associated with multiple L2 caches; and waiting for each of the multiple memory references to return.

12. A computer-readable storage medium storing instructions that when executed by a computer cause the computer to perform a method for modeling the effects of overlapping of memory references in a queuing system model, the method comprising:

processing a memory reference during execution of a queuing system model that simulates performance of a memory system;

determining if the memory reference generates a cache miss;

if the memory reference generates a cache miss, modeling the cache miss in a manner that accounts for possible overlapping of the cache miss with other memory references and other processor operations;

wherein modeling the cache miss involves, forwarding the memory reference to portions of the queuing system model associated with lower levels of a memory hierarchy, probabilistically determining whether or not the cache miss can be overlapped with other memory references, wherein cache misses are modeled as either completely overlapping or non-overlapping, and wherein partial overlaps are accounted for by adjusting the probabilities of complete overlap and non-overlap, if the cache miss can be overlapped, resuming processing of subsequent memory references without waiting for the forwarded memory reference to return, and if the cache miss cannot be overlapped, waiting for the forwarded memory reference to return before processing subsequent memory references.

13. The computer-readable storage medium of claim 12, wherein probabilistically determining whether or not the cache miss can be overlapped involves using a blocking factor, wherein one minus the blocking factor specifies the probability that the memory reference can be overlapped.

14. The computer-readable storage medium of claim 13, wherein there exists a different blocking factor for each combination of cache type and memory reference type.

15. The computer-readable storage medium of claim 14, wherein prior to processing the memory reference, the method further comprises estimating blocking factors for the queueing system model based upon empirically measured hit rates and latencies for a computer system.

16. The computer-readable storage medium of claim 15, wherein the empirically measured hit rates and latencies can be obtained from one of:

a computer system simulator; and a real computer system.

17. The computer-readable storage medium of claim 15, wherein estimating the blocking factors involves iteratively:

estimating the blocking factors based on latencies and hit rates; and running the queueing system model using the estimated blocking factors to determine new latencies to be used in estimating successive blocking factors.

18. The computer-readable storage medium of claim 15, wherein estimating the blocking factors involves using a backfitting technique to estimate the blocking factors.

19. The method of claim 18, wherein the backfitting technique is modified to estimate a product term which is part of an additive component, wherein the additive component is the CPI penalty associated with a specific memory hierarchy level and reference type.

20. The method of claim 18, wherein the backfitting technique uses computed weights in a smoothing step.

21. The computer-readable storage medium of claim 15, wherein the method further comprises incorporating the blocking factors into cache hit rates within the queueing system model.

22. The computer-readable storage medium of claim 12, wherein if the memory reference accesses a memory location that is in the modified state, indicating that a modified content of the memory location resides in an L2 cache, forwarding the memory reference involves:

forwarding multiple memory references to multiple queues associated with multiple L2 caches; and waiting for each of the multiple memory references to return.

23. An apparatus that models the effects of overlapping of memory references in a queuing system model, comprising:

a processing mechanism configured to process a memory reference during execution of a queuing system model that simulates performance of a memory system; and a cache simulating mechanism configured to determine if the memory reference generates a cache miss; and wherein if the memory reference generates a cache miss, the processing mechanism is configured to model the cache miss in a manner that accounts for possible overlapping of the cache miss with other memory references and other processor operations;

wherein while modeling the cache miss, the processing mechanism is configured to, forward the memory reference to portions of the queuing system model associated with lower levels of a memory hierarchy, and to determine probabilistically whether or not the cache miss can be overlapped with other memory references, wherein cache misses are modeled as either completely overlapping or non-overlapping, and wherein partial overlaps are accounted for by adjusting the probabilities of complete overlap and non-overlap, wherein if the cache miss can be overlapped, the processing mechanism is configured to resume processing of subsequent memory references without waiting for the forwarded memory reference to return, and wherein if the cache miss cannot be overlapped, the processing mechanism is configured to wait for the forwarded memory reference to return before processing subsequent memory references.

24. The apparatus of claim 23, wherein while determining whether or not the cache miss can be overlapped, the processing mechanism is configured to use a blocking factor, wherein one minus the blocking factor specifies the probability that the memory reference can be overlapped.

25. The apparatus of claim 24, wherein there exists a different blocking factor for each combination of cache type and memory reference type.

26. The apparatus of claim 25, further comprising a blocking factor estimation mechanism configured to estimate blocking factors for the queueing system model based upon empirically measured hit rates and latencies for a computer system.

27. The apparatus of claim 26, wherein the empirically measured hit rates and latencies can be obtained from one of:
a computer system simulator; and
a real computer system.

28. The apparatus of claim 26, wherein the blocking factor estimation mechanism is configured to iteratively:
estimate the blocking factors based on latencies and hit rates; and to
run the queueing system model using the estimated blocking factors to determine new latencies to be used in estimating successive blocking factors.

29. The apparatus of claim 26, wherein the blocking factor estimation mechanism is configured to use a backfitting technique to estimate the blocking factors.

30. The apparatus of claim 29, wherein the backfitting technique is modified to estimate a product term which is part of an additive component, wherein the additive component is the CPI penalty associated with a specific memory hierarchy level and reference type.

31. The apparatus of claim 29, wherein the backfitting technique uses computed weights in a smoothing step.

32. The apparatus of claim 26, wherein the processing mechanism is configured to incorporate the blocking factors into cache hit rates within the queueing system model.

33. The apparatus of claim 23, wherein if the memory reference accesses a memory location that is in the modified state, indicating that a modified content of the memory location resides in an L2 cache, the processing mechanism is configured to:
forwarding multiple memory references to multiple queues associated with multiple L2 caches; and to
wait for each of the multiple memory references to return.

* * * * *

UNITED STATES PATENT AND TRADEMARK OFFICE
CERTIFICATE OF CORRECTION

PATENT NO. : 7,054,874 B2　　　　　　　　　　　　　　　　　　　　　　Page 1 of 1
APPLICATION NO. : 10/382823
DATED : May 30, 2006
INVENTOR(S) : Ilya Gluhovsky et al.

It is certified that error appears in the above-identified patent and that said Letters Patent is hereby corrected as shown below:

TITLE PAGE, ITEM (56)

In References cited, please delete the patent number, "5,478,961" and replace with the patent number --5,748,961--.

In claim 1 (at column 14, line 15), please delete the word, "gueuing" and replace with the word --queuing--.

Signed and Sealed this

Fifteenth Day of August, 2006

JON W. DUDAS
*Director of the United States Patent and Trademark Office*